(12) United States Patent
Higginbotham

(10) Patent No.: US 9,345,238 B1
(45) Date of Patent: May 24, 2016

(54) BAIT TANK

(71) Applicant: Top Water Tackle LLC, Cleveland, GA (US)

(72) Inventor: John S. Higginbotham, Cleveland, GA (US)

( * ) Notice: Subject to any disclaimer, the term of this patent is extended or adjusted under 35 U.S.C. 154(b) by 270 days.

(21) Appl. No.: 13/948,104

(22) Filed: Jul. 22, 2013

Related U.S. Application Data

(60) Provisional application No. 61/677,092, filed on Jul. 30, 2012.

(51) Int. Cl.
*A01K 97/05* (2006.01)

(52) U.S. Cl.
CPC ...................... *A01K 97/05* (2013.01)

(58) Field of Classification Search
CPC ....................................................... A01K 97/05
USPC .................. 43/55–57; 119/201–203
See application file for complete search history.

(56) References Cited

U.S. PATENT DOCUMENTS

| | | | | |
|---|---|---|---|---|
| 2,007,326 A * | 7/1935 | Carpenter | ......................... | 43/56 |
| 2,032,274 A * | 2/1936 | Fonos | ..................... | A01K 97/05 43/56 |
| 2,297,843 A * | 10/1942 | Sharpnack | ............. | A01K 97/05 43/56 |
| 2,302,336 A * | 11/1942 | MacDonald | ....................... | 43/55 |
| 2,564,598 A * | 8/1951 | Grimshaw | ............. | A01K 97/05 43/56 |
| 2,594,172 A * | 4/1952 | Huffman | ................ | A01K 97/05 43/56 |
| 2,639,906 A * | 5/1953 | Butler | ............................... | 43/57 |
| 2,700,243 A * | 1/1955 | Johnson | ................. | A01K 97/05 43/56 |
| 2,772,867 A * | 12/1956 | Cleckner | ........................... | 43/57 |
| 3,217,444 A * | 11/1965 | Howard | ................ | A01K 97/05 43/57 |
| 3,302,789 A * | 2/1967 | Holt | ............................... | 210/793 |
| 3,509,657 A * | 5/1970 | Bross, Jr. | ........................... | 43/57 |
| 3,553,880 A * | 1/1971 | Splickan et al. | ................... | 43/55 |
| 3,640,516 A * | 2/1972 | Willinger | ........................... | 43/57 |
| 3,687,111 A * | 8/1972 | Epper | ..................... | A01K 63/02 119/201 |
| 3,815,277 A * | 6/1974 | Murray | ............................. | 43/57 |
| 4,162,681 A * | 7/1979 | Patterson | ....................... | 119/203 |

(Continued)

FOREIGN PATENT DOCUMENTS

| | | | |
|---|---|---|---|
| JP | 6027111 Y2 * | 7/1994 | |
| JP | 2509947 Y2 * | 9/1996 | |

(Continued)

OTHER PUBLICATIONS

Blue Water Bait Tanks, "About our Bait Tanks—Blue Water Bait Tanks," 2004, published at www.bluewaterbaittanks.com/tanks.cfm.

(Continued)

*Primary Examiner* — Darren W Ark

(74) *Attorney, Agent, or Firm* — Eric W. Cernyar

(57) ABSTRACT

A portable bait tank is provided with an exteriorly mounted aerator pump mounted within a protective cavity of the body of the tank. The bait tank also includes a molded in filter box plus a lid for housing a gravity filter and an aerator. An auxiliary, valve-operated pump-out port enables the pump to expel water from the bait container. The valve for the pump-out port is operated by moving the aerator head between a circulating position and a pump-out position. The bait tank also includes an access port that has splash-inhibiting lips that extend downwardly into the container formed by the tank body and a deep-seated oxygen bottle holder and accompanying orifice for the oxygen bottle tubing.

16 Claims, 4 Drawing Sheets

(56) References Cited

U.S. PATENT DOCUMENTS

| | | | | |
|---|---|---|---|---|
| 4,168,590 A | * | 9/1979 | Beshoner, Sr. | A01K 63/02 43/55 |
| 4,198,776 A | * | 4/1980 | Tomita | 43/56 |
| 4,271,099 A | * | 6/1981 | Kukla | 43/57 |
| 4,513,525 A | * | 4/1985 | Ward et al. | 43/56 |
| 4,615,137 A | * | 10/1986 | Radmanovich | 43/57 |
| 4,832,073 A | * | 5/1989 | Campau | 43/57 |
| 4,994,177 A | * | 2/1991 | Bogar, Jr. | 43/57 |
| 5,077,932 A | * | 1/1992 | Hetherington | 43/57 |
| 5,100,543 A | * | 3/1992 | Stauffer et al. | 43/57 |
| 5,138,975 A | * | 8/1992 | Walsh | 43/56 |
| 5,172,511 A | * | 12/1992 | Smith et al. | 43/56 |
| 5,231,789 A | * | 8/1993 | Radmanovich | A01K 97/05 43/57 |
| 5,406,740 A | * | 4/1995 | Wilkin | 43/56 |
| 5,471,779 A | * | 12/1995 | Downey | A01K 97/22 43/54.1 |
| 5,632,220 A | * | 5/1997 | Vento | 43/57 |
| 5,634,291 A | * | 6/1997 | Pham | 43/57 |
| 5,799,435 A | * | 9/1998 | Stafford | 43/57 |
| 5,802,760 A | * | 9/1998 | Campbell | 43/57 |
| 6,729,066 B1 | * | 5/2004 | Howley | 43/57 |
| 6,836,998 B1 | * | 1/2005 | Rucker | 43/57 |
| 7,024,814 B1 | * | 4/2006 | McDougle | 43/57 |
| 7,162,831 B1 | * | 1/2007 | Morton et al. | 43/57 |
| 7,389,608 B1 | * | 6/2008 | MacKay | 43/57 |
| 7,484,476 B2 | * | 2/2009 | Stafford | 43/57 |
| 7,644,535 B2 | * | 1/2010 | Sloop | 43/57 |
| 8,281,729 B1 | * | 10/2012 | Beck | 43/57 |
| 8,572,889 B1 | * | 11/2013 | Hughes et al. | 43/57 |
| 8,806,803 B1 | * | 8/2014 | Mitchell et al. | 43/57 |
| 9,220,250 B1 | * | 12/2015 | Davis, Sr. | A01K 97/05 |
| 2003/0033746 A1 | * | 2/2003 | Johnson et al. | 43/55 |
| 2005/0204610 A1 | * | 9/2005 | Bogart et al. | 43/55 |
| 2007/0068063 A1 | * | 3/2007 | Simpson | 43/57 |
| 2008/0028667 A1 | * | 2/2008 | Grzybowski | 43/57 |
| 2009/0188152 A1 | * | 7/2009 | Davin | 43/56 |
| 2012/0085019 A1 | * | 4/2012 | Link | 43/55 |

FOREIGN PATENT DOCUMENTS

| | | | | |
|---|---|---|---|---|
| JP | 2001148986 A | * | 6/2001 | A01K 97/05 |
| JP | 2002186393 A | * | 7/2002 | A01K 97/05 |
| JP | 2011010600 A | * | 1/2011 | |

OTHER PUBLICATIONS

Core Fishing Tackle, "Creek Bank Bait Tanks—20 Gallon, 30 Gallon and 50 Gallon Tanks," date unknown, published at www.corefishingtackle.com/CreekBankBaitTanks.html.

Grayline BaitTanks, "Products," date unknown, published at https://www.graylinebaittanks.com/?page=12&sku=24WWASS.

Keepalive, "Bait Tanks," date unknown, published at www.keepalive.net/tanks.htm.

Killer Bait, "Bait Tank Products," date unknown, published at www.killerbaittank.com/killerbaittank_003.htm.

Kodiak Marine Products, "Pro Flow Bait Tanks," 2005, published at www.kodiakmarine.com/pro-flow.html.

Datasheet. "Pump-Out Aerator" Flow-Rite. Mar. 16, 2009 pp. 5-6.

Datasheet. "Tsunami Aerator Pump" (at http://www.attwoodmarine.com/userfiles/store/product/files/1041/0tsunamiaerator_spec.pdf) last accessed Sep. 28, 2015. p. 1.

* cited by examiner

BAIT TANK

RELATED APPLICATIONS

This application claims priority based on U.S. Provisional Application Ser. No. 61/677,092, filed Jul. 30, 2012, entitled BAIT TANK, which is herein incorporated by reference in its entirety.

FIELD OF THE INVENTION

This invention relates to bait tanks.

BACKGROUND

Bait tanks typically employ submersible pumps to circulate the water through a filtration and/or aeration system. Many anglers use a separate pump to pump the water out of the tank at the end of the day. Some tanks enable the angler to switch the pump from a circulate mode to a pump-out mode provided that the user unhooks at least one tube from one port and hooks it up to another port. Also, many anglers oxygenate the water inside their bait tanks using an oxygen bottle that is either mounted in a boat bracket or that is lying on, and potentially rolling about, the bottom of the boat.

SUMMARY

A novel bait tank is provided. One feature of the bait tank is the provision of an integrally molded protective shielding cavity or recess for an external pump, eliminating the need for a submersible pump. Another feature is the provision of an aerator with an integrated valve-operated pump-out port, enabling use of the existing aerator pump to expel water from the tank without requiring the detachment or reconnection of hoses between ports or the use of an additional pump and tubing. Yet another feature is an access port that includes splash-inhibiting lips that extend downwardly into the container formed by the tank body, allowing water to slosh around inside the container around the circumferential lips while minimizing the amount of water cresting above the access port and splashing outside the tank. A still further feature is a deep-seated oxygen bottle holder and orifice for the oxygen bottle tubing.

It will be understood that, except as set forth in the claims, the invention is not limited to any single one or any combination of the above-referenced novel features or to any of the specific details set forth in the detailed description below.

DETAILED DESCRIPTION

Figure 1:
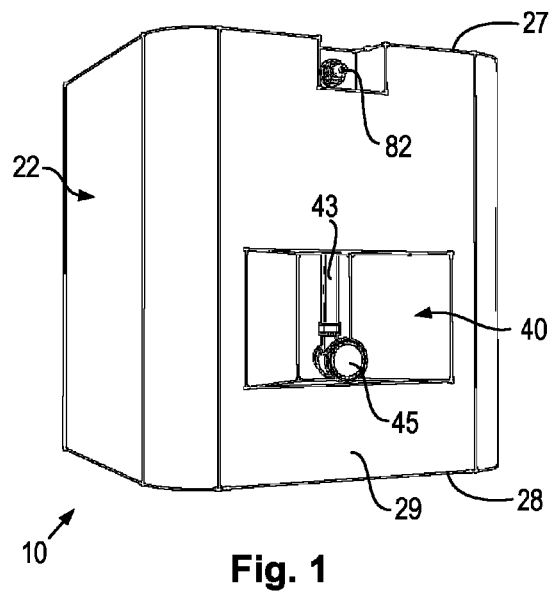
FIG. 1 is a perspective angled view of one embodiment of a bait tank, particularly illustrating an integrally molded protective shielding cavity or recess for an external pump along the back side of the tank.
Figure 2:
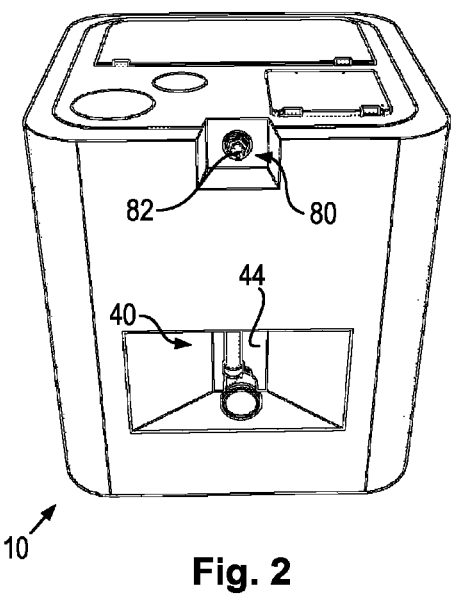
FIG. 2 is an alternative perspective elevated view of the bait tank of FIG. 1, particularly illustrating an integrally molded pump-out seat.
Figure 3:
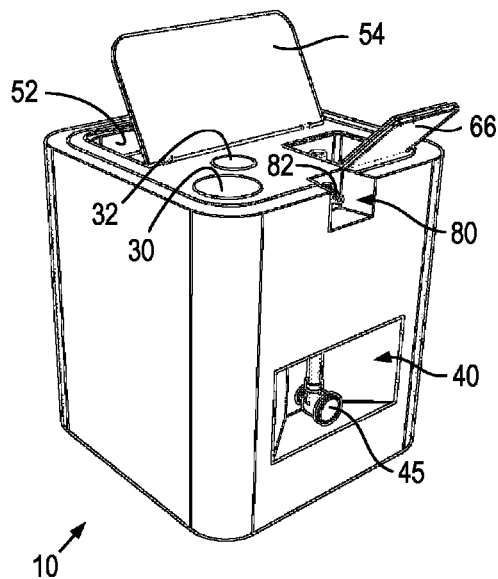
FIGS. 3 and 4 are additional perspective elevated views of the bait tank of FIG. 1, particularly illustrating a bait container access port and other top surface features of the bait tank.
Figure 4:
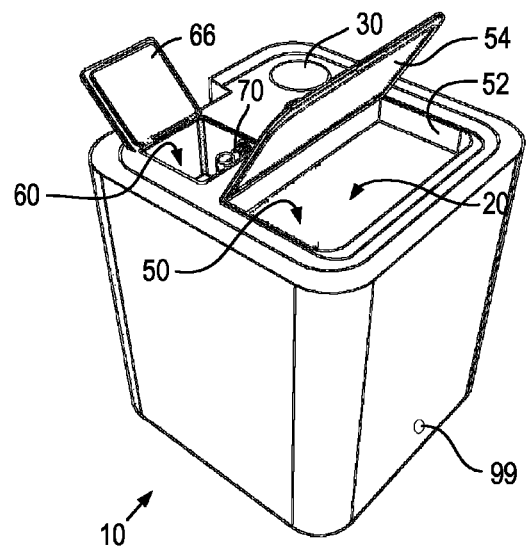
Figure 5:
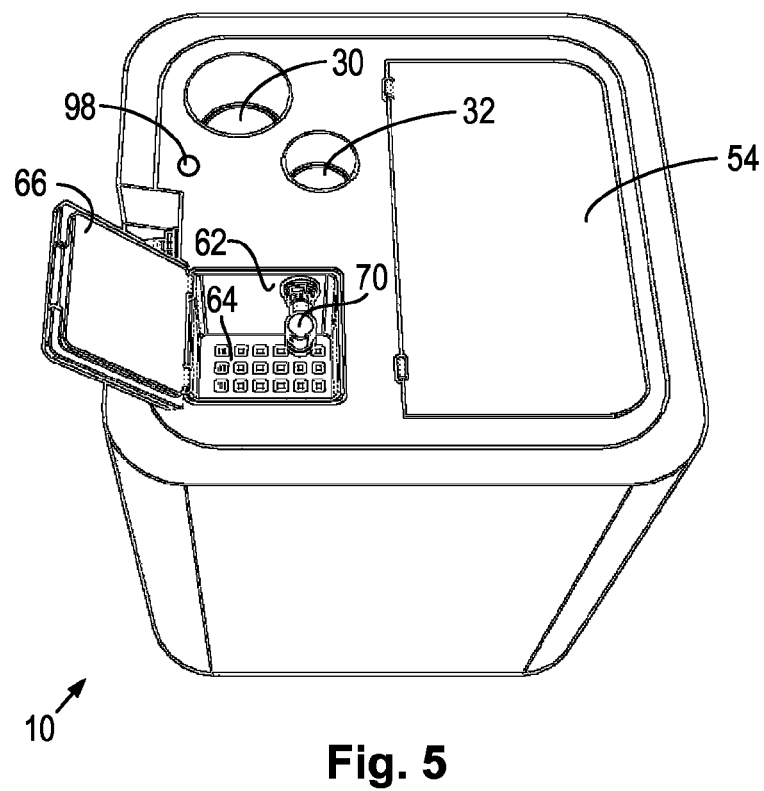
FIG. 5 is a top perspective view of the bait tank of FIG. 1, particularly illustrating the filter compartment and aerator.

In describing preferred and alternate embodiments of the bait tank described herein, as illustrated in FIGS. 1-12, specific terminology is employed for the sake of clarity. The technology described herein, however, is not intended to be limited to the specific terminology so selected, and it is to be understood that each specific element includes all structural equivalents that operate in a similar manner to accomplish similar functions.

FIGS. 1-8 illustrate one embodiment of a bait tank 10. The bait tank 10 comprises a tank body 22 having an exterior 25 and an interior 26. The tank body and container may be formed of an integrally molded piece. Alternatively, the exterior 25 may comprise an inner shell and the interior 26 an outer shell, with a layer 24 of insulation between the inner and outer shells. The interior 26 forms an insulated bait container 20 for holding live bait within an oxygenated supply of water. The exterior 25 has a top side 27, a bottom side 28, and at least one sidewall 29 joining the top and bottom sides. A typical bait tank 10 will have dimensions that, depending on the bait tank size, range from anywhere between about one foot and three feet per side, and capacities of between about 10 gallons and 300 gallons.

A molded filter compartment or filter box 60 is formed in the top side 27 of the tank body 22 for housing a filter and an aerator. The bottom of the filter compartment 60 comprises a grate 64 or holes or a plurality of apertures to allow water to return into the bait container 20. A mechanical or chemical gravity filter or filtration device (not shown) is configured to rest along a bottom side of the filter compartment 60, below an aerator discharge nozzle 72. A filter compartment lid 66, hingedly connected to the top side 27 of the tank body 22, provides access to the filter compartment 60.

An aerator assembly 70 (FIGS. 10 and 11) is mounted via a flange assembly 75 to a sidewall 62 of the filter compartment 60. The aerator assembly 70 includes a venturi aerator head 71, a discharge nozzle 72 for discharging oxygenated water from the aerator head 71, an intake port 73 for directing water to the aerator head, and a pump-out port 77. The venturi aerator head 71 is mounted to a telescoping tube 74 that passes through an aperture (not shown) in the filter compartment sidewall 11. The telescoping tube 74 supports and extends the aerator head 71 over a gravity filter (not shown) on one side of the filter compartment sidewall 62. The intake port 73 and pump-out port 77 are positioned on the opposite side of the filter compartment sidewall 62. Water flows from the intake port 73 of the aerator assembly 70 through the aerator head 71 and out the discharge nozzle 72 onto the gravity filter (not shown). The filtered water then falls through the grate 64 in the bottom of the filter compartment 60 into the bait container 20.

The aerator head 71 and telescoping tube 74 are movable between a retracted circulating position 78 (FIG. 10) and an extended pump-out position 79 (FIG. 11) with respect to the filter compartment sidewall 62. Such movement operates an integrated valve (not shown) that has a first setting fluidly connecting the intake port 73 to the discharge nozzle 72 and a second setting fluidly connecting the intake port 73 to the pump-out port 77.

A pump-shielding cavity or pocket 40 in the sidewall 29 of the exterior 26 of the tank body 22—which in the depicted embodiment has a substantially trapezoidal cross section—is integrally formed in the outside of the at least one sidewall 29. The cavity 40 forms a protective shield for an aerator pump 45 when mounted within the cavity 40. The aerator pump 45 is operable to both circulate water in the bait container 20 and pump water out of the bait container 20. The aerator pump 45 (FIG. 12) houses a motor (not shown) and has an inlet port 47 and an outlet port 48 with exterior threads or barbs for fitting to a pump output conduit 43.

The aerator pump 45 also has a pipe and wall mounting assembly 49 that is mounted via a watertight fitting to a rear sidewall 44, and through a pump inlet aperture 41, of the cavity 40. The inlet port 47, which extends inside the bait container 20, is connected to a conduit 31 that is positioned to draw water in from the bottom of the bait container 20.

Figure 6:
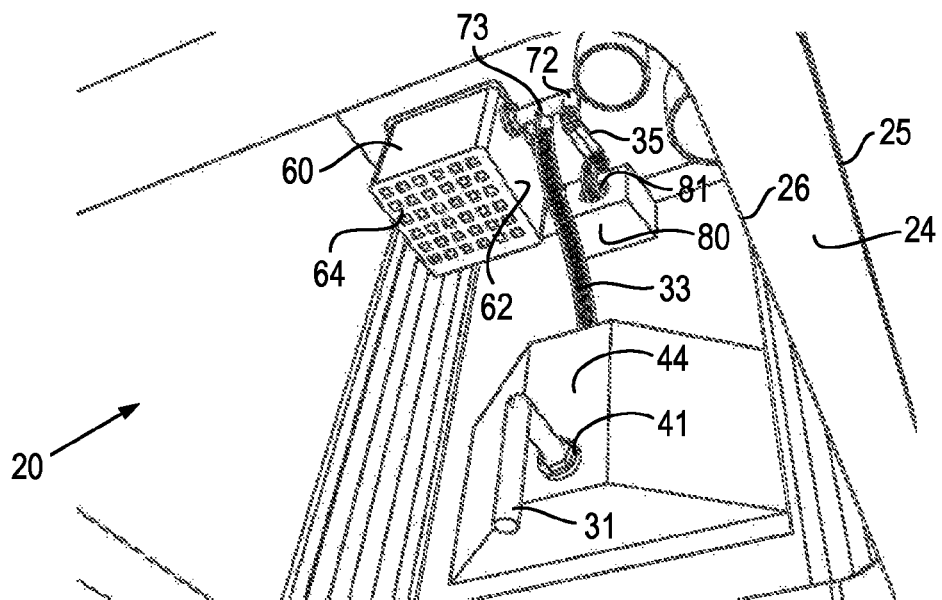
FIG. 6 is a perspective cut-away view of a portion of the interior of the bait tank of FIG. 1, particularly illustrating the internal conduits that link the pump, aerator, and pump-out orifice.
Figure 7:
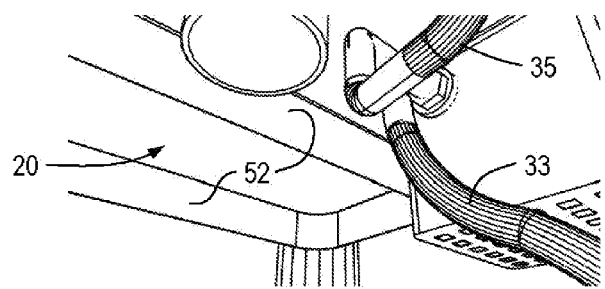
FIG. 7 is a perspective view of another portion of the interior of the bait tank of FIG. 1, particularly illustrating the splash-inhibiting lips of the bait container access port that extend downwardly into the container.
Figure 8:
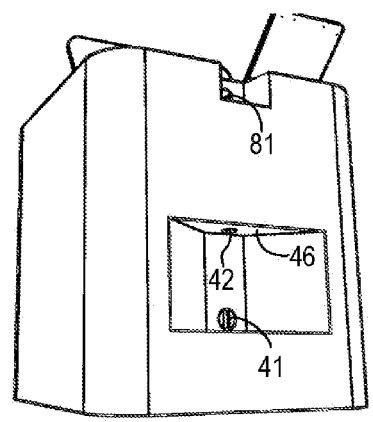
FIG. 8 is a perspective angled view of the back of the bait tank of FIG. 1 with the pump and pump-out fitting removed to reveal various apertures that pass through bait container walls.
Figure 9:
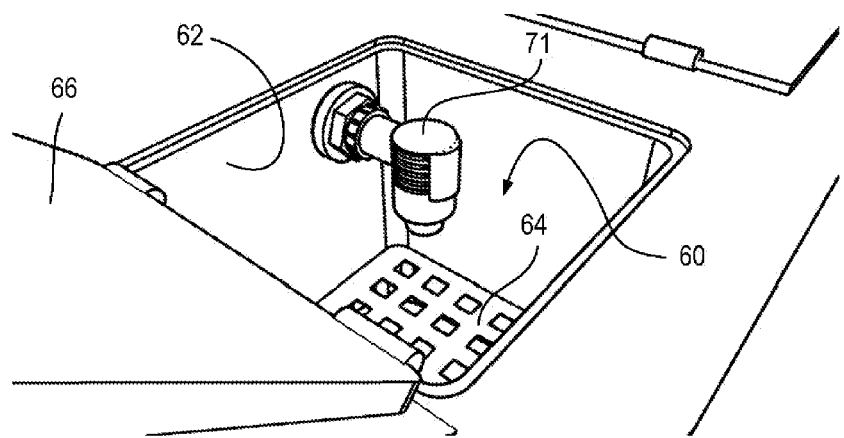
FIG. 9 is a perspective elevated view of the filter compartment of FIG. 1.
Figure 10:
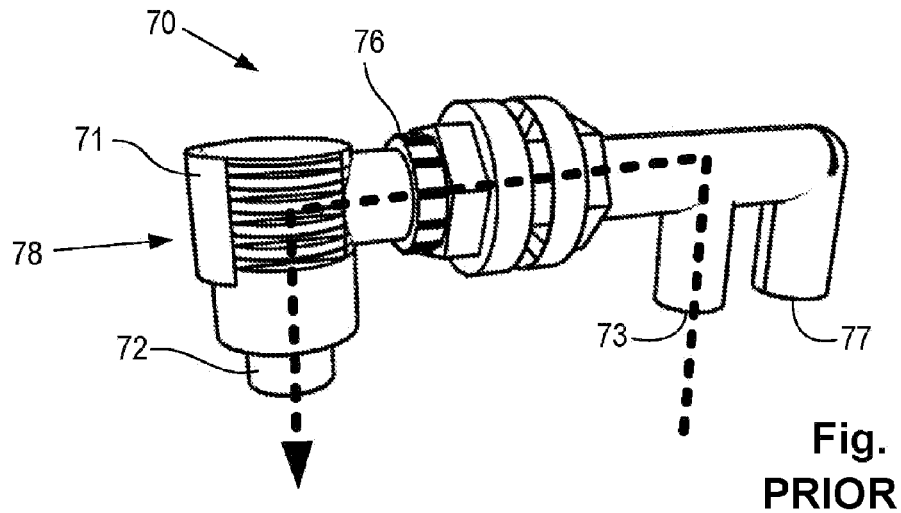
FIGS. 10 and 11 provide perspective views of one embodiment of an aerator assembly known in the art and incorporated into the bait tank.
Figure 11:
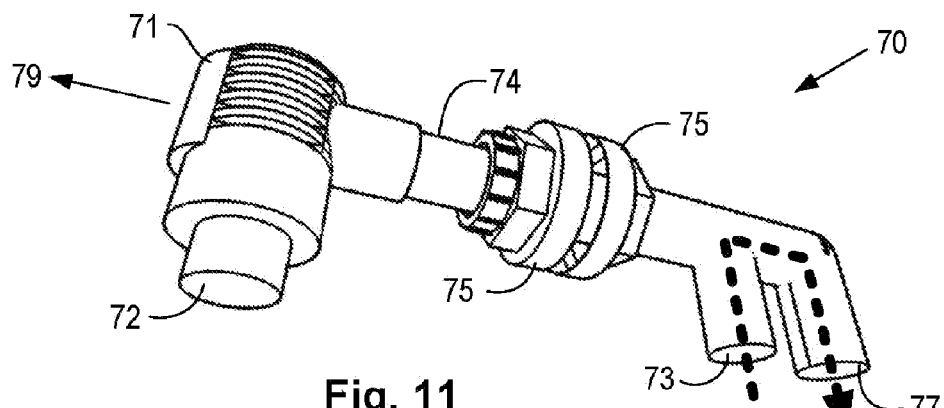
Figure 12:
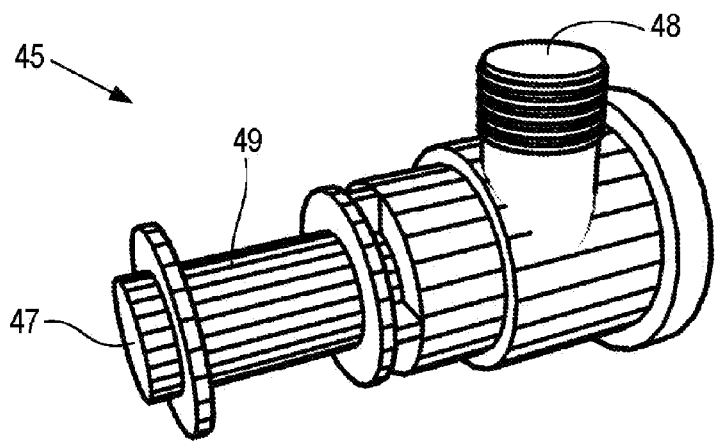
FIG. 12 provides a perspective view of one embodiment of an aerator pump known in the art and suitable for mounting within the shielding cavity of the novel bait tank.

The pump output conduit 43 (FIG. 1) connects the pump 45 to an exterior fluid-tight fitting (not shown) mounted on a pump return aperture 42 in the cavity roof 46 (FIG. 8). On the opposite side of the aperture 42, inside the bait container 20, a flexible aerator inflow conduit 33 (for example, a hose or other tubing) connects an interior fluid-tight fitting (not shown) mounted on the pump return aperture 42 to the intake port 73 of the aerator assembly 70 (FIG. 6).

A pump-out seat 80 for pumping water out of the bait container 20 is formed in the top side of the tank body 22. The pump-out seat 80 includes a pump-out orifice 81 that passes into the bait container 20. A pump-out fitting 82, with barbs or threads for connecting an exterior hose, is mounted to the pump-out orifice 81. Inside the bait container 20, a flexible conduit 35 (for example, an interior hose) connects the pump-out port 77 of the aerator assembly 70 to the pump-out orifice 81.

As is now evident from the description above, operation of the aerator assembly valve enables the aerator pump 45 to selectively circulate water in the bait container 20 and expel water from the container 20 without requiring the detachment or reconnection of any conduits. When the aerator head 71 is in its retracted position, the aerator assembly valve fluidly connects the intake port 73 to the discharge nozzle 72. When the aerator head 71 is in its extended position, the aerator assembly valve fluidly connects the intake port 73 to the pump-out port 77. When water needs to be changed during fishing, or at the end of a day, the aerator valve is operated to direct pumped water through the pump-out fitting 82 on the side of the tank body 22.

The bait tank 10 includes additional features and improvements. An access port 50 on the top side 27 of the tank body 22 provides access to the bait container 20. A bait container lid 54 is hingedly mounted on the top side 27 of the tank body 22 over the access port 50. The access port 50 includes splash-inhibiting lips 52 that extend downwardly into the container 20 formed by the tank body 22.

The bait tank 10 also features a cylindrical oxygen bottle holder 30 formed in the top side 27 of the tank body 22 for holding an oxygen bottle to increase the level of dissolved oxygen in the bait tank 10. In one embodiment, the oxygen bottle holder 30 has a diameter of about 4.5 inches and a depth of about 6 inches. Oxygen from the bottle flows through a regulator and tubing and into a diffuser positioned inside the bait tank 10. An orifice 98 (FIG. 5) is provided in the top side 27 of the bait tank 10, adjacent the oxygen bottle holder 30, to enable passage of the tubing from the oxygen bottle into the bait container 20. In one embodiment, the orifice 98 doubles as a gravity drain for the tank if the tank is turned upside down. A removable plug is provided for the orifice 98. In another embodiment, the bait tank 10 includes a gravity drain 99 near the bottom of the tank 10. In addition, one or more cup holders 32 are formed in the top side 27 of the tank body 22.

The foregoing specific details describe various embodiments of the invention, but persons reasonably skilled in the art will recognize that various changes may be made in the details of the apparatus or method of this invention without departing from the spirit and scope of the invention as defined in the appended claims. The present invention includes several independently meritorious inventive aspects and advantages. Unless compelled by the claim language itself, the claims should not be construed to be limited to structures that incorporate all of the inventive aspects, or enjoy all of the advantages, disclosed herein.

I claim:

1. A bait tank comprising:
   a tank body having an exterior and an interior, the interior forming an insulated bait container for holding live bait within an oxygenated supply of water, the exterior having a top side, bottom side, and at least one sidewall joining the top and bottom sides;
   an access port on the top side on the tank body that provides access to the bait container;
   a bait container lid mounted on the top side of the tank body over the access port;
   a filter compartment formed in the top side of the tank body for housing a filter and an aerator;
   a filter compartment lid providing access to the filter compartment;
   an aerator pump for circulating water in the bait container;
   a pump-shielding unenclosed cavity formed in and recessed with respect to the exterior of the at least one sidewall of the tank body, wherein the aerator pump is mounted to the exterior of the tank body within the unenclosed cavity and the unenclosed cavity provides a protective shield for the pump;
   a pump inlet aperture formed through a wall defining a portion of the pump-shielding unenclosed cavity with a watertight fitting fluidly connecting the bait container to an inlet port of the aerator pump, wherein an opening of the pump-shielding unenclosed cavity is defined along the exterior of the tank body and is open to surroundings of the bait tank; and
   a conduit within the pump-shielding unenclosed cavity fluidly connected to an outlet port of the aerator pump.

2. The bait tank of claim 1, wherein the access port includes splash-inhibiting lips that extend downwardly into the container formed by the tank body.

3. The bait tank of claim 1, further comprising an aerator assembly having a venturi aerator head, an intake port for directing water to the aerator head, the intake port fluidly connected to the conduit within the pump-shielding unenclosed cavity so as to fluidly connect the intake port to the outlet port of the aerator pump, and a discharge nozzle for discharging oxygenated water from the aerator head.

4. The bait tank of claim 3, wherein the aerator assembly further comprises a valve and a pump-out port in fluid connection with the intake port, wherein the valve is operated by moving the aerator head between a circulating position fluidly connecting the intake port to the discharge nozzle and a pump-out position fluidly connecting the intake port to the pump-out port.

5. The bait tank of claim 4, wherein the pump-out port is in fluid connection with a pump-out fitting mounted on the tank body.

6. The bait tank of claim 5, wherein the pump-out fitting is mounted within a pump-out seat formed in the top side of the tank body.

7. The bait tank of claim 1, further comprising a mechanical gravity filter configured to rest along a bottom side of the filter compartment.

8. The bait tank of claim 1, further comprising a chemical filtration device inside the filter compartment.

9. The bait tank of claim 1, further comprising a cylindrical oxygen bottle holder formed in the top side of the tank body for holding an oxygen bottle to increase the level of dissolved oxygen in the bait tank.

10. The bait tank of claim 1, further comprising at least one cup holder formed in the top side of the tank body.

11. The bait tank of claim 1, wherein the tank body comprises an inner shell, an outer shell, and a layer of insulation between the inner and outer shells.

12. A bait tank comprising:
a tank body having an exterior and an interior, the interior forming a bait container for holding live bait within an oxygenated supply of water, the exterior having a top side, bottom side, and at least one sidewall joining the top and bottom sides;
a filter compartment formed in the top side of the tank body;
an aerator assembly housed inside the tank body, the aerator assembly having an aerator head, a discharge nozzle, an intake port, a pump-out port, and an integrated valve that has a first setting fluidly connecting the intake port to the discharge nozzle and a second setting fluidly connecting the intake port to the pump-out port, wherein the aerator head is positioned inside the filter compartment;
a pump-out orifice formed in the bait container for expelling water from the bait container;
a pump for circulating water in the bait container and for expelling water from the bait container;
a first conduit connecting the pump to the aerator intake port; and
a second conduit connecting the aerator pump-out port to the pump-out orifice;
wherein the aerator head is mechanically connected to the integrated valve for movement with the integrated valve, enabling the valve to be operated between its first and second settings by reaching into the filter compartment and manipulating the aerator head;
wherein operation of the valve enables the pump to selectively circulate water in the bait container and expel water from the bait container without requiring the detachment or reconnection of any of the conduits.

13. The bait tank of claim 12, wherein the mechanical connection of the aerator head to the integrated valve comprises the aerator head being attached to a telescoping conduit that is movable between retracted and extended positions to operate the valve at the first and second settings respectively.

14. The bait tank of claim 12, further comprising:
a pump-shielding cavity formed in the exterior of the tank body, wherein the pump is mounted to the exterior of the tank body within the cavity and the cavity provides a protective shield for the pump; and
a pump inlet port for passing water from the bait container to the pump.

15. The bait tank of claim 12, further comprising:
an access port on the top side on the tank body that provides access to the bait container; and
a bait container lid mounted on the top side of the tank body over the access port;
wherein the access port includes splash-inhibiting lips that extend downwardly into the container formed by the tank body.

16. A bait tank comprising:
a tank body having an exterior and an interior, the interior forming an insulated bait container for holding live bait within an oxygenated supply of water, the exterior having a top side, bottom side, and at least one sidewall joining the top and bottom sides;
an access port on the top side on the tank body that provides access to the bait container;
a bait container lid mounted on the top side of the tank body over the access port;
an aerator assembly having a venturi aerator head, an intake port for directing water to the aerator head, and a discharge nozzle for discharging oxygenated water from the aerator head;
a filter compartment formed in the top side of the tank body housing a filter and the aerator head, wherein the aerator assembly is mounted to a sidewall of the filter compartment and the aerator head is positioned above the filter;
a filter compartment lid providing access to the filter compartment;
an aerator pump for circulating water in the bait container;
a pump-shielding cavity formed in the exterior of the tank body, wherein the aerator pump is mounted to the exterior of the tank body within the cavity and the cavity provides a protective shield for the pump.

* * * * *